(12) United States Patent
Murayama et al.

(10) Patent No.: US 12,192,781 B2
(45) Date of Patent: Jan. 7, 2025

(54) USER TERMINAL AND RADIO COMMUNICATION METHOD

(71) Applicant: NTT DOCOMO, INC., Tokyo (JP)

(72) Inventors: Daisuke Murayama, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 475 days.

(21) Appl. No.: 17/605,949

(22) PCT Filed: Apr. 23, 2019

(86) PCT No.: PCT/JP2019/017215
§ 371 (c)(1),
(2) Date: Oct. 22, 2021

(87) PCT Pub. No.: WO2020/217309
PCT Pub. Date: Oct. 29, 2020

(65) Prior Publication Data
US 2022/0217543 A1 Jul. 7, 2022

(51) Int. Cl.
| | |
|---|---|
| *H04W 16/14* | (2009.01) |
| *H04W 72/0453* | (2023.01) |
| *H04W 74/00* | (2009.01) |
| *H04W 74/08* | (2024.01) |
| *H04W 74/0816* | (2024.01) |

(52) U.S. Cl.
CPC ....... *H04W 16/14* (2013.01); *H04W 72/0453* (2013.01); *H04W 74/006* (2013.01); *H04W 74/0816* (2013.01); *H04W 74/0866* (2013.01)

(58) Field of Classification Search
CPC .... H04L 5/0044; H04L 5/0094; H04W 16/14; H04W 72/0453; H04W 74/006; H04W 74/0816; H04W 74/0866
See application file for complete search history.

(56) References Cited

U.S. PATENT DOCUMENTS

| | | |
|---|---|---|
| 2017/0171859 A1 | 6/2017 | Nimbalker et al. |
| 2018/0176956 A1* | 6/2018 | Koutsimanis ..... H04W 74/0808 |
| 2018/0352571 A1 | 12/2018 | Wang et al. |

(Continued)

FOREIGN PATENT DOCUMENTS

| | | |
|---|---|---|
| WO | 2017/135297 A1 | 8/2017 |
| WO | 2017/157466 A1 | 9/2017 |

OTHER PUBLICATIONS

3GPP TSG-RAN WG1 Meeting #96bis; R1-1904334 "UL signals and channels for NR-U" Ericsson; Xi'an, China; Apr. 8-12, 2019 (8 pages).

(Continued)

*Primary Examiner* — Srinivasa R Reddivalam
(74) *Attorney, Agent, or Firm* — Osha Bergman Watanabe & Burton LLP

(57) ABSTRACT

A user terminal includes a receiving section that receives information to be used to determine a set of resource blocks in a given interval in a given band in a carrier, and a control section that determines, as a frequency-domain resource to be assigned to an uplink shared channel or a downlink shared channel, the set determined based on the information. Accordingly, it is possible to appropriately control assignment of frequency-domain resources to an uplink shared channel or downlink shared channel transmitted by interlace transmission.

4 Claims, 13 Drawing Sheets

INTERLACE #0 ($N_{INT1} = 0$)

INTERLACE #1 ($N_{INT2} = 1$)

(56) References Cited

U.S. PATENT DOCUMENTS

2019/0342911 A1* 11/2019 Talarico ............... H04L 5/0098
2022/0124698 A1*  4/2022 Noh ..................... H04W 72/51
2022/0132475 A1*  4/2022 Lei ....................... H04L 5/0044
2022/0174699 A1*  6/2022 El Hamss ........ H04W 72/1268

OTHER PUBLICATIONS

3GPP TSG RAN WG1 Meeting #96; R1-1902108 "NR-U enhancements for uplink signals and channels" Nokia, Nokia Shanghai Bell; Athens, Greece; Feb. 25-Mar. 1, 2019 (10 pages).
Office Action issued in Japanese Application No. 2021-515350; Dated Sep. 20, 2022 (6 pages).
International Search Report issued in PCT/JP2019/017215 on Jun. 25, 2019 (1 page).
Written Opinion of the International Searching Authority issued in PCT/JP2019/017215 on Jun. 25, 2019 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

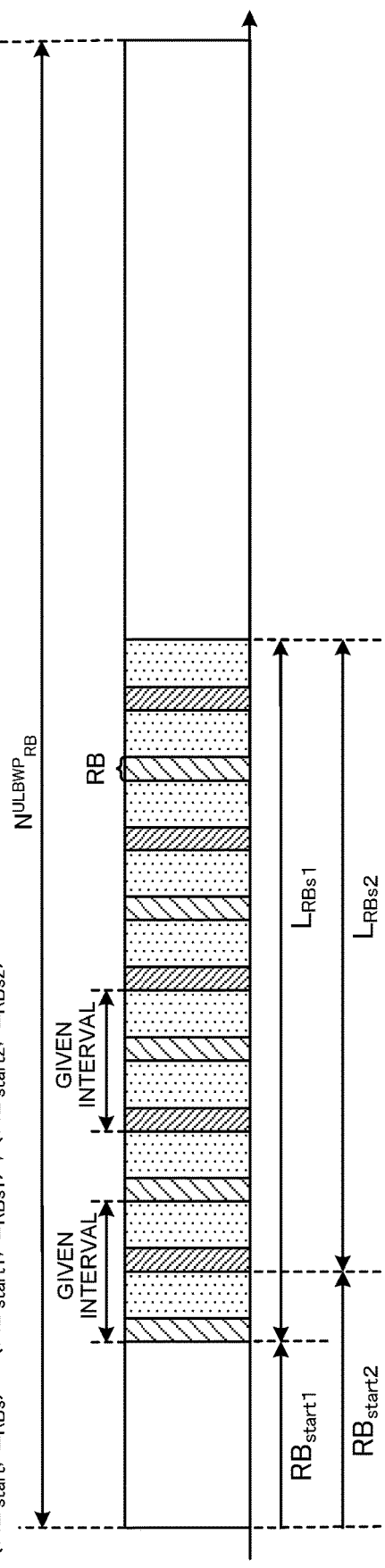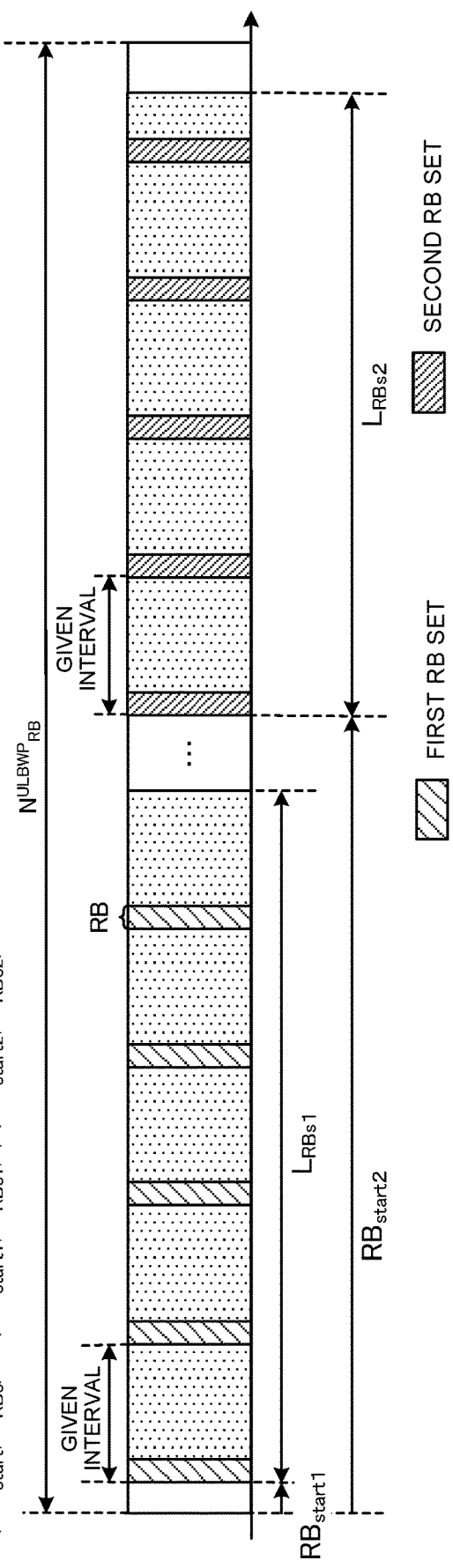

USER TERMINAL AND RADIO COMMUNICATION METHOD

TECHNICAL FIELD

The present invention relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Discussions have been made on transmission (interlace transmission) using a set (RB set; also referred to as interlace or the like) of resource blocks (RB; also referred to as physical RB or the like) in a given interval in a future radio communication system (hereinafter also referred to as NR).

However, in a case of interlace transmission of an uplink shared channel (for example, Physical Uplink Shared Channel (PUSCH)) or a downlink shared channel (for example, Physical Downlink Shared Channel (PDSCH)), assignment of frequency-domain resources (for example, the above-described RB set) to the uplink shared channel or the downlink shared channel may not be appropriately controlled.

The present invention is made in view of the above-described point, and an object of present invention is to provide a user terminal and a radio communication method that are capable of appropriately controlling assignment of frequency-domain resources to an uplink shared channel or downlink shared channel transmitted by interlace transmission.

Solution to Problem

A user terminal according to an aspect of the present invention includes a receiving section that receives information to be used to determine a set of resource blocks in a given interval in a given band in a carrier, and a control section that determines, as a frequency-domain resource to be assigned to an uplink shared channel or a downlink shared channel, the set determined based on the information.

Advantageous Effects of Invention

According to the present invention, it is possible to appropriately control assignment of frequency-domain resources to an uplink shared channel or downlink shared channel transmitted by interlace transmission.

BRIEF DESCRIPTION OF DRAWINGS

FIGS. 4A and 4B are diagrams to show other examples of interlace frequency-domain resource assignment according to the first aspect;

DESCRIPTION OF EMBODIMENTS (NR-U)

Figure 1:
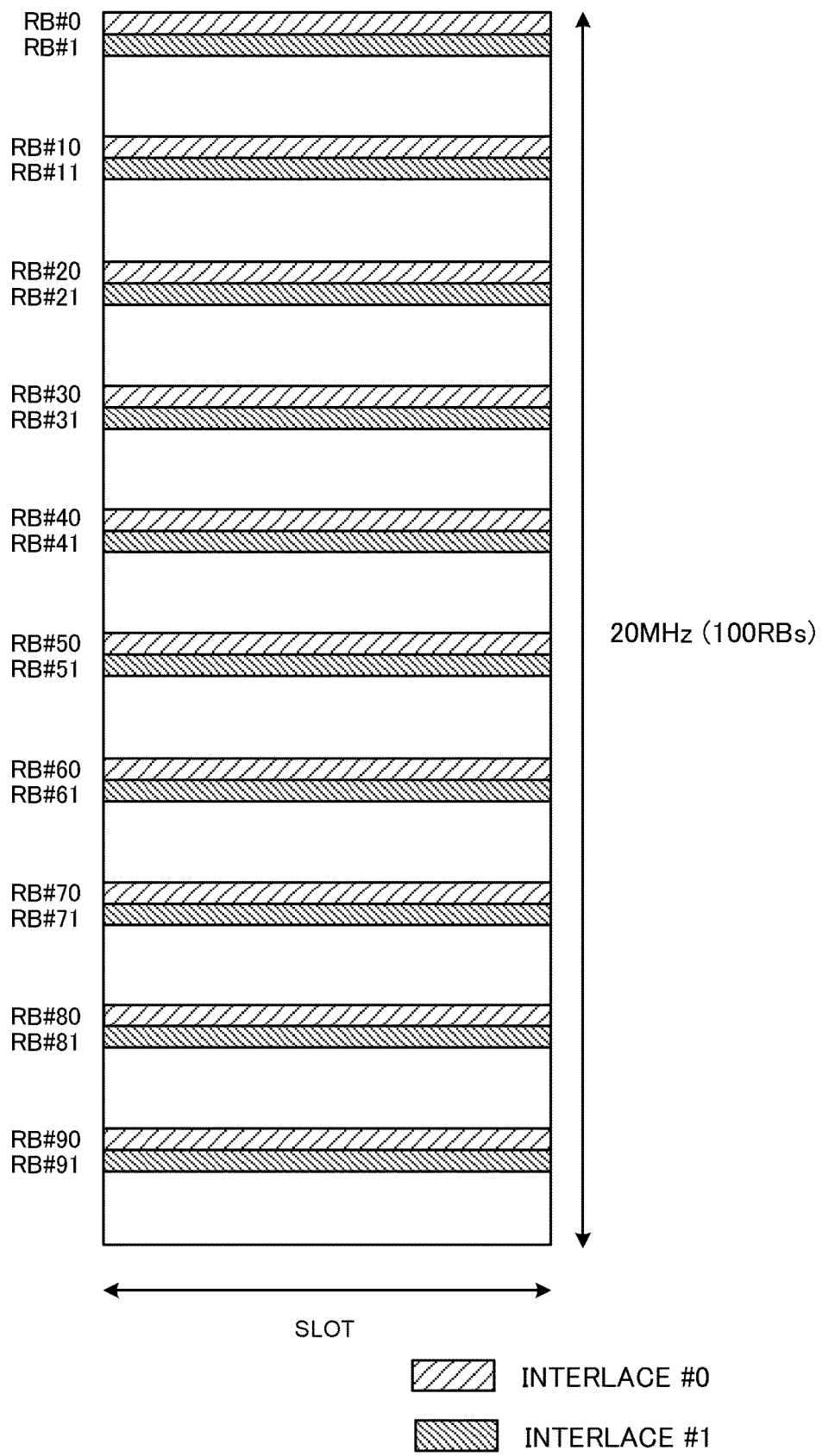
FIG. 1 is a diagram to show an example of interlace transmission.

Discussions have been made on use of not only a frequency band (licensed band) licensed to a telecommunication carrier (operator) but also a frequency band (unlicensed band) (for example, 2.4 GHz band or 5 GHz band) different from the licensed band in a future radio communication system (for example, NR).

An NR system that uses an unlicensed band may be referred to as, for example, an NR-Unlicensed (U), NR License-Assisted Access (LAA), or NR-U system.

It is assumed that a plurality of systems such as not only an NR-U system but also another LAA system and a Wi-Fi (registered trademark) system coexist in an unlicensed band, and thus at least one of interference control and collision control is performed among the plurality of systems.

Before transmitting a signal (for example, data signal) in an unlicensed band, a transmission node in an NR-U system performs listening that checks whether there is transmission from another node (for example, a base station, a user terminal, or a Wi-Fi apparatus). Note that the listening may be referred to as Listen Before Talk (LBT), Clear Channel Assessment (CCA), carrier sense, or channel access procedure.

The transmission node may be, for example, a base station (for example, gNodeB, (gNB), transmission/reception point (TRP), or network (NW)) in a case of downlink (DL), or a user terminal (for example, User Equipment (UE)) in a case of uplink (UL). A reception node that receives a signal from the transmission node may be, for example, a UE in a case of DL or a base station in a case of UL.

The transmission node starts transmission a given duration after (for example, right after or a back-off duration after) no transmission (idle) from another apparatus is detected in the listening, and does not perform signal transmission when transmission from another apparatus (busy, LBT-busy) is detected in the listening.

When no transmission from another node (idle, LBT-idle) is detected in the listening, the transmission node acquires transmission opportunity (TxOP, channel occupancy) and starts signal transmission. A time of the transmission opportunity is referred to as Channel Occupancy Time (COT).

The COT is a total time length of all transmission in the transmission opportunity and a gap in a given time and may be equal to or shorter than a maximum COT (MCOT). The MCOT may be determined based on a channel access priority class. The channel access priority class may be associated with a contention window size.

An NR-U system as described above may be managed in carrier aggregation (CA) or dual connectivity (DC) of an unlicensed-band component carrier (CC) (unlicensed CC) and a licensed-band CC (licensed CC) or may be managed by a stand-alone (SA) unlicensed CC.

Note that an unlicensed CC may be interchangeably interpreted with, for example, an unlicensed band, an unlicensed spectrum, a secondary cell (SCell), a licensed assisted access (LAA) SCell, an LAA cell, a primary cell (also referred to as PCell, Primary Secondary Cell (PSCell), Special Cell (SpCell), or the like), a frequency to which channel sensing is applied, or an NR-U target frequency.

A licensed CC may be interchangeably interpreted with, for example, a licensed band, a licensed spectrum, a PCell, a PSCell, an SpCell, an SCell, a non-NR-U target frequency, a Rel.15, an NR, a frequency to which channel sensing is not applied, or an NR target frequency.

(Interlace Transmission)

Given constraints need to be satisfied to use an unlicensed CC. For example, according to regulations of European Telecommunications Standards Institute (ETSI), an occupied channel bandwidth (OCB) including 99% of electric power of a signal needs to be equal to or larger than 80% of an available bandwidth (for example, a system bandwidth) in a case of use of 5 GHz as an unlicensed carrier. In addition, constraints related to a maximum transmit power spectral density (Power Spectral Density (PSD)) per given bandwidth (1 MHz) are defined.

To satisfy such constraints (for example, OCB regulations), an unlicensed CC performs transmission (interlace transmission) using a set (also referred to as RB set, interlace, or the like) of a plurality of frequency-domain resources at a given interval, which has been discussed.

Interlace transmission may be referred to as, for example, multi-cluster transmission in a given unit of frequency-domain resource, or Block Interleaved Frequency Division Multiple Access (block IFDMA). One interlace may be defined as a set of a plurality of frequency-domain resources to be assigned at a given frequency interval (for example, an interval of 10 RBs).

Frequency-domain resources included in one interlace and dispersed in the frequency direction may be each referred to as a cluster. One cluster may be configured as, for example, one or more contiguous RBs, sub carriers, or resource block groups. Note that it is assumed that frequency hopping in each cluster is not applied, but the frequency hopping may be applied.

FIG. 1 is a diagram to show an example of interlace transmission. For example, in FIG. 1, the entire available bandwidth (for example, system band) is 20 MHz (for example, 100 RBs), and an interlace #i is constituted with 10 RBs (clusters) having index values {i, i+10, i+20, . . . , i+90}.

As shown in FIG. 1, 10 interlaces #0 to #9 are provided when the entire available bandwidth is 20 MHz. One or more interlaces may be assigned to a user terminal as frequency-domain resource for uplink signals.

It is assumed that, in an NR-U, a bandwidth of 20 MHz or larger (for example, a variable band of integral multiples of 20 MHz) is available, depending on a vacancy situation.

A bandwidth of 20 MHz or larger is referred to as, for example, a wide-band carrier, a wide band, an LAA S cell, an LAA cell, an NR-U carrier, an NR-U cell, or a cell. As for a wide-band carrier, it has been discussed that the listening is performed not for the entire carrier but for each partial band (for example, 20 MHz) in the carrier. The partial band is also referred to as, for example, a given band, a sub-band, an LBT sub-band, or a listening band.

When interlace transmission is performs in such a bandwidth of 20 MHz or larger, a problem is how to control frequency-domain resource assignment to an uplink shared channel (for example, Physical Uplink Shared Channel (PUSCH)) or a downlink shared channel (for example, Physical Downlink Shared Channel (PDSCH)).

Figure 2A:
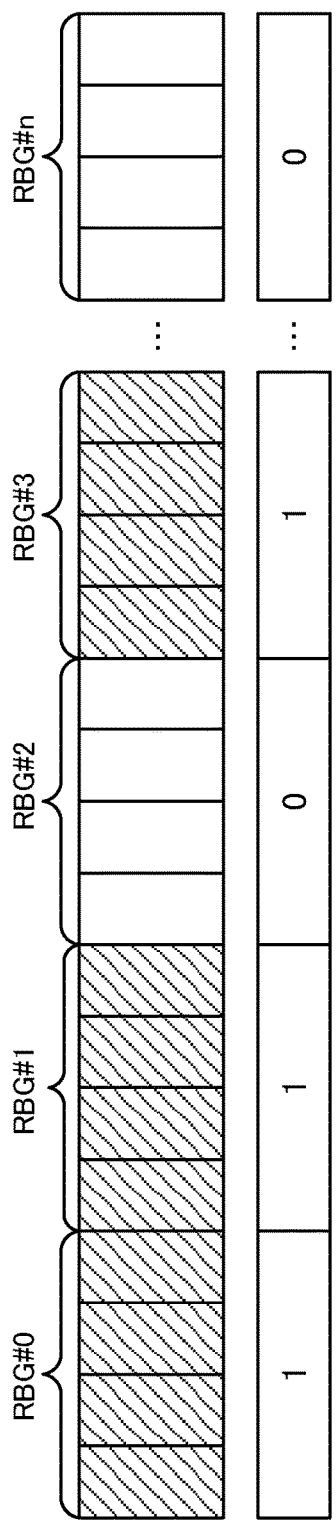
FIGS. 2A and 2B are diagrams to show examples of uplink resource assignment types 0 and 1.
Figure 2B:
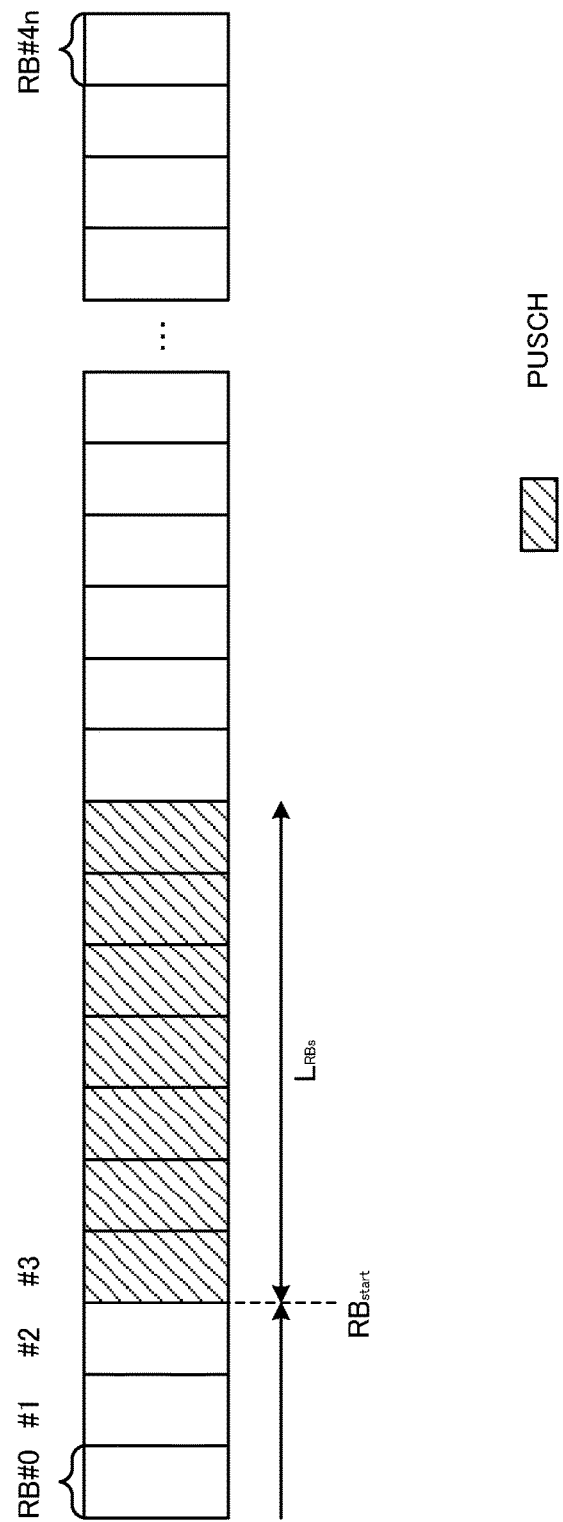

For example, in NR Rel.15, a first type (also referred to as uplink resource assignment type 0, type 0, or the like) and a second type (also referred to as uplink resource assignment type 1, type 1, or the like) are assumed as schemes of frequency-domain resource assignment to a PUSCH. FIGS. 2A and 2B are diagrams to show examples of the uplink resource assignment types 0 and 1.

As shown in FIG. 2A, in the type 0, frequency-domain resources to be assigned to a PUSCH are indicated by using a bit map in the unit of resource block group (RBG) constituting with a plurality of contiguous RBs. For example, in FIG. 2A, RBGs #0, #1, and #3 are assigned to a PUSCH for a UE. Note that the number of RBs included in an RBG is four in FIG. 2A, but not limited thereto.

As shown in FIG. 2A, in the type 0, discontiguous frequency-domain resources can be assigned to a PUSCH, but the unit of assignment is RBG.

As shown in FIG. 2B, in the type 1, frequency-domain resources to be assigned to a PUSCH are indicated by using a start resource block ($RB_{start}$) and the number (length; $L_{RBs}$) of contiguously assigned resource blocks. For example, in FIG. 2A, a PUSCH for a UE is assigned to seven contiguous RBs indicated by $L_{RBs}$ from RB #3 indicated by $RB_{start}$.

As shown in FIG. 2B, in the type 1, frequency-domain resources can be assigned to a PUSCH in the unit of RB but are limited to contiguous RBs.

As described above, the schemes of frequency-domain resource assignment to a PUSCH in Rel.15 do not assume interlace transmission (for example, FIG. 1). Thus, when interlace transmission is applied to a PUSCH, frequency-domain resources may not be appropriately assigned to the PUSCH.

In particular, the frequency of interference arrival from another unknown system possibly varies among frequency bands in an NR-U for which PUSCH interlace transmission is assumed to be performed in a bandwidth of 20 MHz or larger. Thus, it is desired to more flexibly and efficiently assign frequency-domain resources to a PUSCH to which interlace transmission is applied. The same problem can also occur with frequency-domain resource assignment to a PDSCH to which interlace transmission is applied.

Thus, the inventors of the present invention studied a method of appropriately assigning frequency-domain resources to a PUSCH or PDSCH to which interlace transmission is applied, and reached the present invention. Specifically, the inventors of the present invention came up with an idea that a UE receives information (resource assignment information) used to determine a set of RBs in a given interval in a given band in a carrier and determines, as frequency-domain resources to be assigned to a PUSCH or PDSCH, the set determined based on the information.

Embodiments according to the present disclosure will be described in detail with reference to the drawings as follows. Aspects of the present embodiment may be each applied alone or may be applied in combination.

Note that the following describes determination of frequency-domain resources to be assigned to a PUSCH scheduled by downlink control information (DCI), but the present embodiment is not limited thereto. The present embodiment is also applicable to PUSCH transmission using a configured grant.

PUSCH interlace transmission in an unlicensed carrier is assumed in the following description, but the present embodiment is not limited thereto. The present embodiment is also applicable to PUSCH interlace transmission in a licensed carrier.

The following description assumes that a set (also referred to as RB set, interlace, or the like) of RBs in a given interval in a given band in a carrier are assigned to a PUSCH, but the present embodiment is not limited thereto. A carrier may be interpreted as a bandwidth part (BWP) in the carrier.

(First Aspect)

In a first aspect, the resource assignment information may include information (for example, each resource indication value (RIV)) indicating the start resource block $RB_{START}$ of each RB set and the number $L_{RBs}$ of resource blocks contiguous from the start resource block $RB_{START}$.

A UE may receive the information indicating the start resource block $RB_{START}$ and the number $L_{RBs}$ of resource blocks and may determine, as frequency-domain resources to be assigned to a PUSCH, each RB set determined based on the information.

The information (for example, one or more RIVs) indicating the start resource block $RB_{START}$ and the number $L_{RBs}$ of resource blocks may be indicated by a given field value (for example, the value of a frequency-domain resource assignment (FDRA) field) in DCI (for example, DCI format 0_0 or 0_1).

The UE may determine, as frequency-domain resources to be assigned to a PUSCH, an RB set constituting with RBs in each given interval from the start resource block $RB_{START}$, in a given band of the number $L_{RBs}$ of resource blocks from the start resource block $RB_{START}$. The given interval may be given in specifications or may be configured (notified) to the UE by higher layer signaling.

Note that, in the present disclosure, higher layer signaling may be at least one of information (also referred to as broadcast information, master information block (MIB), or the like) transmitted through a broadcast channel (Physical Broadcast Channel), system information (also referred to as system information block (SIB) or the like), Radio Resource Control (RRC) signaling (also referred to as RRC parameter, RRC information element (IE), or the like), and Medium Access Control (MAC) signaling (also referred to as MAC control element (CE) or the like).

<Single RB Set>

Figure 3:
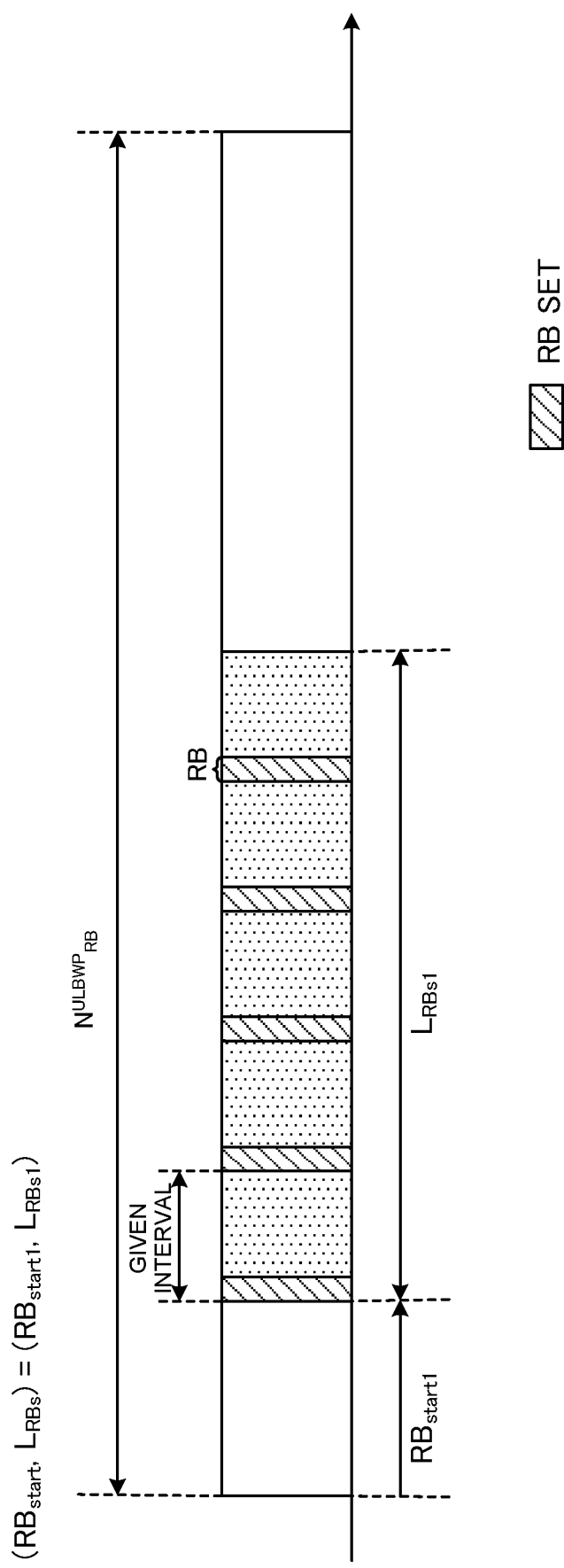
FIG. 3 is a diagram to show an example of interlace frequency-domain resource assignment according to a first aspect.

FIG. 3 is a diagram to show an example of interlace frequency-domain resource assignment according to the first aspect. In FIG. 3, the UE receives information (for example, an RIV) indicating a start resource block $RB_{START1}$ of a single RB set to be assigned to a PUSCH and a number $L_{RBs1}$ of resource blocks contiguous from the start resource block $RB_{START1}$. The information may be, for example, a given field value (for example, an FRDA field value) in DCI.

The UE may determine, as frequency-domain resources to be assigned to a PUSCH, an RB set of RBs in each given interval (given number of RBs) from the start resource block $RB_{START1}$, in a given band of the number $L_{RBs1}$ of resource blocks contiguous from the start resource block $RB_{START1}$. The given interval may be determined in specifications in advance or may be notified to the UE by higher layer signaling.

In FIG. 3, since the single RIV indicates the start resource block $RB_{START1}$ of the single RB set and the number $L_{RBs1}$ of resource blocks contiguous from the start resource block $RB_{START1}$, the single RB set can be assigned to a PUSCH transmitted by interlace transmission, by using a given field value (for example, FDRA field value) in an existing DCI format (for example, DCI format 0_0 or 0_1).

<Single RB Set>

FIGS. 4A and 4B are diagrams to show other examples of interlace frequency-domain resource assignment according to the first aspect. FIG. 4A illustrates an example in which a plurality of RB sets in a contiguous band are assigned to a PUSCH. FIG. 4B illustrates an example in which a plurality of RB sets in a plurality of respective discontiguous bands are assigned to a PUSCH. Differences from FIG. 3 will be mainly described below with reference to FIGS. 4A and 4B.

In FIGS. 4A and 4B, the UE may receive information (for example, a first RIV) indicating a start resource block $RB_{START1}$ of a first RB set and a number $L_{RBs1}$ of resource blocks contiguous from the start resource block $RB_{START1}$, and information (for example, a second RIV) indicating a start resource block $RB_{START}2$ of a second RB set and a number $L_{RBs2}$ of resource blocks contiguous from the start resource block $RB_{START2}$. The information may be indicated by, for example, a given field value (for example, an FRDA field value) in DCI.

The UE may determine, as frequency-domain resources to be assigned to a PUSCH, the first RB set of RBs in each given interval (given number of RBs) from the start resource block $RB_{START1}$ in a first band of the number $L_{RBs1}$ of resource blocks contiguous from the start resource block $RB_{START1}$, and the second RB set of RBs in a given interval (given number of RBs) from the start resource block $RB_{START2}$ in each given band of the number $L_{RBs2}$ of resource blocks contiguous from the start resource block $RB_{START2}$ in a second band of the number $L_{RBs2}$ of resource blocks contiguous from the start resource block $RB_{START2}$.

As shown in FIG. 4A, a plurality of bands each constituting with a number $L_{RBs}$ of resource blocks from the corresponding one of a plurality of respective start resource blocks $RB_{START}$ may at least partially overlap each other. For example, in FIG. 4A, the first band including the first RB set includes the second band including the second RB set. In other words, these plurality of bands may be contiguous in the frequency domain.

Alternatively, as shown in FIG. 4B, a plurality of bands each constituting with a number $L_{RBs}$ of resource blocks from the corresponding one of a plurality of start resource blocks $RB_{START}$ may be discontiguous from each other. For example, in FIG. 4A, the first band including the first RB set is discontiguous from the second band including the second RB set in the frequency domain.

In FIGS. 4A and 4B, since a plurality of RIVs each indicate the start resource block $RB_{START}$ of one of a plurality of RB sets and the corresponding number $L_{RBs}$ of resource blocks contiguous from the start resource block $RB_{START}$, the plurality of RB sets in a contiguous band or a plurality of discontiguous bands can be assigned to a PUSCH transmitted by interlace transmission, while minimizing extension to a given field value (for example, FDRA field value) in an existing DCI format (for example, DCI format 0_0 or 0_1) (only by applying a change to specify the plurality of RIVs).

According to the first aspect, frequency-domain resources can be appropriately assigned to a PUSCH transmitted by interlace transmission since the resource assignment information includes information (for example, each RIV) indicating the start resource block $RB_{START}$ of each RB set and the number $L_{RBs}$ of resource blocks contiguous from the start resource block $RB_{START}$.

(Second Aspect)

In a second aspect, the resource assignment information may include information (at least one RIV) indicating the start resource block $RB_{START}$ of at least one band in a carrier and the number $L_{RBs}$ of resource blocks in the given band, and information indicating an index (RB set index or interlace index) $N_{INT}$ of at least one RB set in the at least one band.

The UE may receive the information indicating each start resource block $RB_{START}$ and the corresponding number $L_{RBs}$ of resource blocks, and the information indicating at least one interlace index $N_{INT}$ and may determine, as frequency-domain resources to be assigned to a PUSCH, at least one RB set in each band, which is determined based on the information.

The information (for example, at least one RIV) indicating each start resource block $RB_{START}$ and the corresponding number $L_{RBS}$ of resource blocks may be indicated by a given field value (for example, FDRA field value) in DCI (for example, DCI format 0_0 or 0_1). The information indicating at least one interlace index $N_{INT}$ may be indicated by the given field value (for example, FDRA field value) in the DCI or may be indicated by another field value.

The UE may determine, as frequency-domain resources to be assigned to a PUSCH, at least one RB set specified by the at least one interlace index $N_{INT}$ in each band determined by a corresponding start resource block $RB_{START}$ and the corresponding number $L_{RBS}$ of resource blocks.

Association (linkage) between each RB in each band and an interlace index (RB set index, interlace, or RB set) may be given in specifications or may be configured for the UE by higher layer signaling.

<Contiguous Band>

Figure 5:
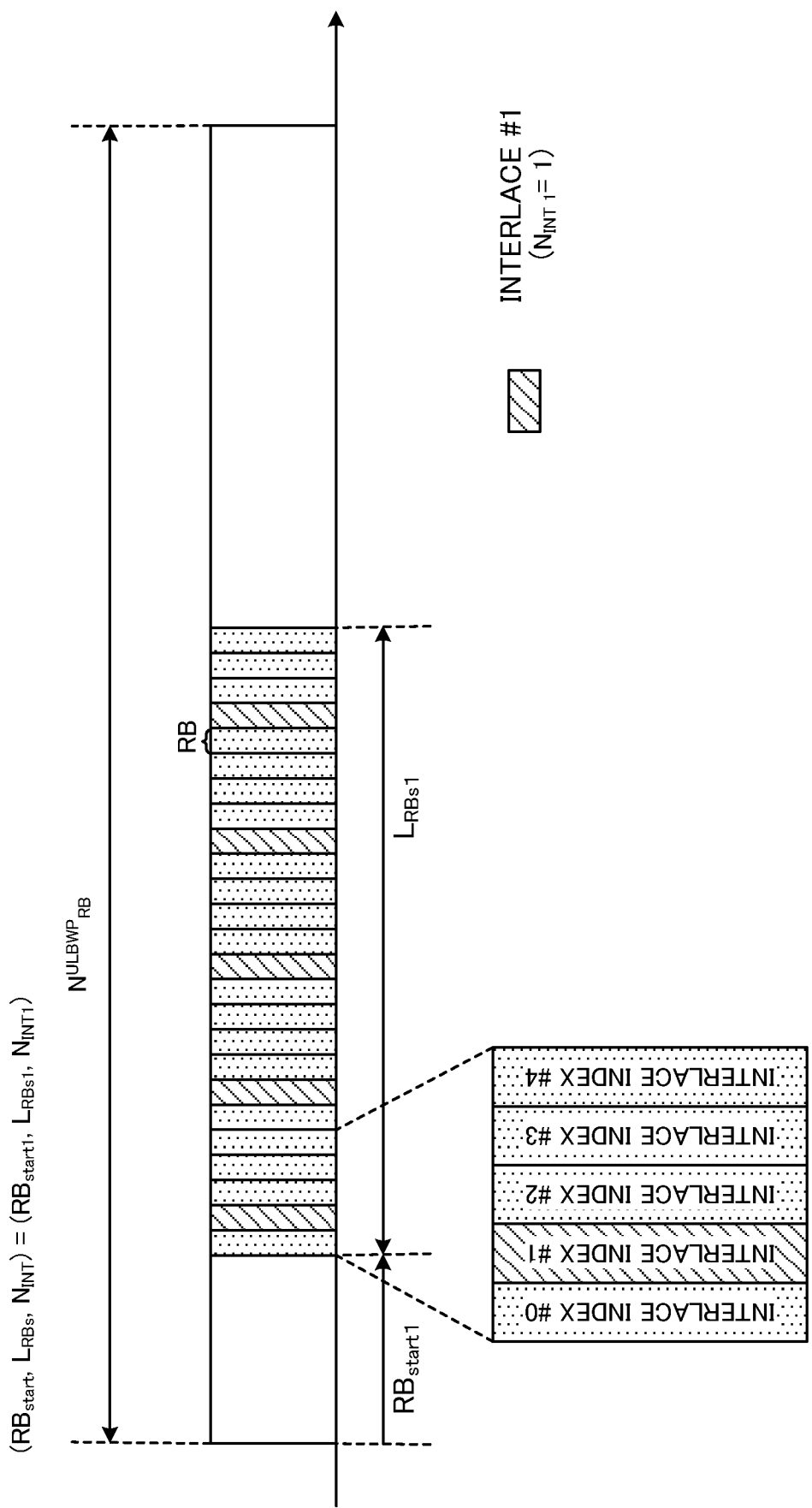
FIG. 5 is a diagram to show an example of interlace frequency-domain resource assignment in a contiguous band according to a second aspect.

FIG. 5 is a diagram to show an example of interlace frequency-domain resource assignment in a contiguous band according to the second aspect. In FIG. 5, the UE receives information (for example, an RIV) indicating the start resource block $RB_{START1}$ of a given band in a carrier and the number $L_{RBs1}$ of resource blocks contiguous from the start resource block $RB_{START1}$ (in other words, the number of resource blocks in the given band), and information indicating the interlace index $N_{INT}$.

The information indicating $RB_{START1}$ and $L_{RBs1}$ may be indicated by, for example, a given field value (for example, an FRDA field value) in DCI. The information indicating the interlace index $N_{INT}$ may be indicated by the given field value in the DCI or may be indicated by another field value.

FIG. 5 illustrates an example in which interlaces #0 to #4 are located at a given interval in a band constituting with $L_{RBs1}$ resource blocks contiguous from $RB_{START1}$ for example, but the number of interlaces is not limited to that shown in FIG. 5.

Association between each RB and an interlace index (interlace or RB set) may be determined in specifications in advance or may be configured by RRC signaling. For example, in FIG. 5, the interlace #i (in this example, i=0 to 4) is configured as an RB set including RBs in each given interval (in this example, a 5-RB interval) from $RB_{START1}$1+i in the above-described band. Note that association between each RB and an interlace index (interlace) is not limited to that shown in the drawing.

The UE may determine, as frequency-domain resources to be assigned to a PUSCH, an RB set (interlace #1) specified by an interlace index $N_{INT1}$ (in FIG. 5, $N_{INT}$1=1), in a band determined by the start resource block $RB_{START1}$ and the number $L_{RBs1}$ of resource blocks.

In FIG. 5, since an RIV indicating the start resource block $RB_{START}$ of a given band in a carrier and the number $L_{RBs}$ of resource blocks in the given band and the interlace index $N_{INT}$ are notified to the UE, one or more RB sets can be assigned to a PUSCH transmitted by interlace transmission by reducing extension to an existing DCI format (for example, DCI format 0_0 or 0_1) (for example, by indicating the interlace index $N_{INT}$).

Note that, in FIG. 5, a single RB set (interlace) in the above-described given band is assigned to the UE, but a plurality of RB sets (interlaces) may be assigned to the UE. In this case, the UE may receive information indicating a plurality of interlace indices $N_{INT}$.

<Discontiguous Bands>

The resource assignment information may include information (a plurality of RIVs) indicating the start resource block $RB_{START}$ of each of a plurality of discontiguous bands in a carrier and the number $L_{RBs}$ of resource blocks in the given band, and information indicating the index (RB set index or interlace index) $N_{INT}$ of at least one RB set common to or individual among the plurality of bands.

Figure 6:
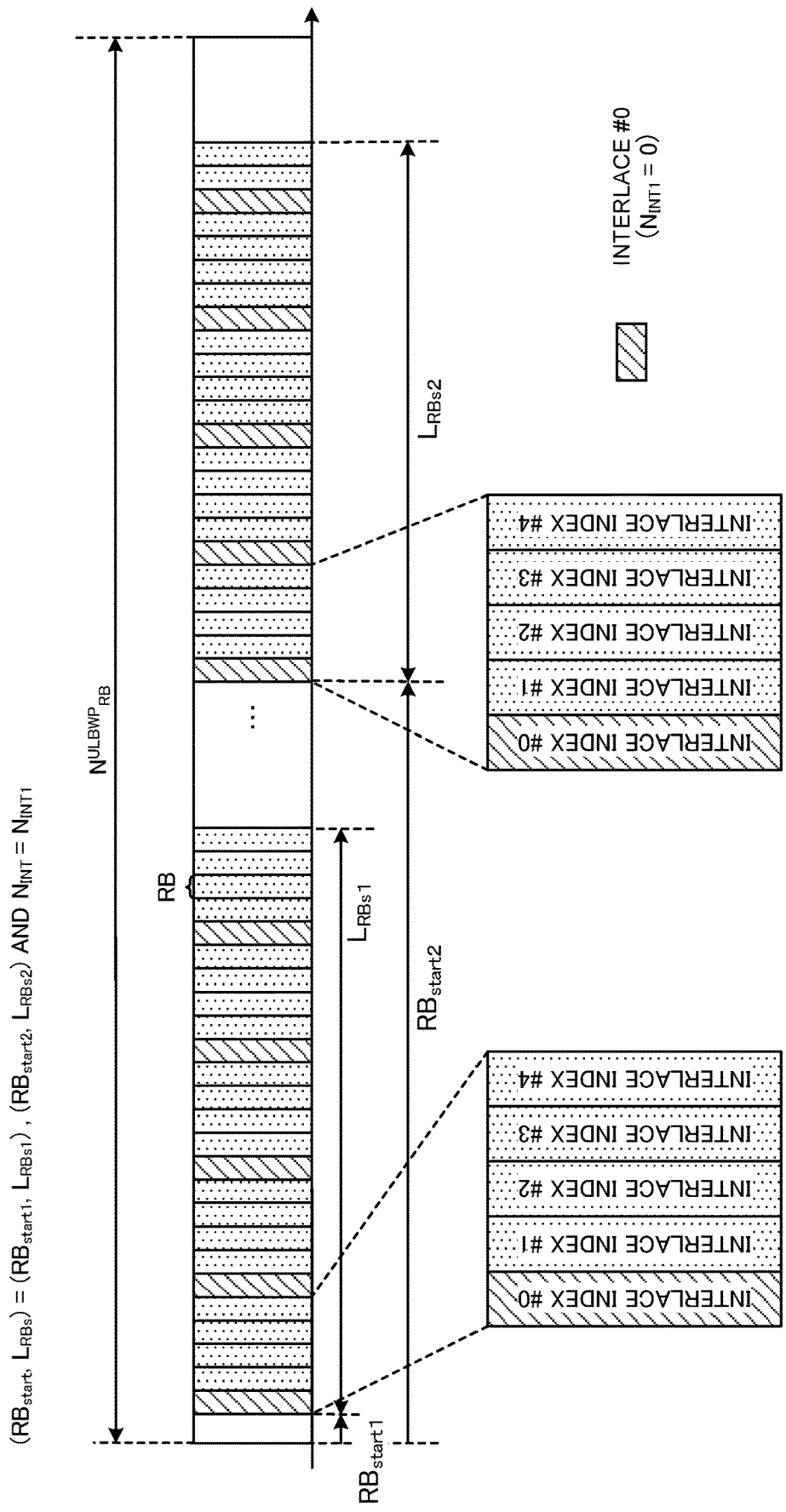
FIG. 6 is a diagram to show an example of interlace frequency-domain resource assignment in discontiguous bands according to the second aspect.

FIG. 6 is a diagram to show an example of interlace frequency-domain resource assignment in discontiguous bands according to the second aspect. In FIG. 6, the UE receives information (for example, first and second RIVs) indicating start resource blocks $RB_{START1}$ and $RB_{START2}$ of first and second discontiguous bands in a carrier and the numbers $L_{RBs1}$ and $L_{RBs1}$ of resource blocks contiguous from the respective start resource blocks $RB_{START1}$ and $RB_{START2}$ (in other words, the number of resource blocks in the given band), and information indicating an interlace index $N_{INT}$ common to the first and second bands.

The information indicating $RB_{START1}$ and $L_{RBs1}$ (for example, the first RIV) and the information indicating $RB_{START2}$ and $L_{RBs2}$ (for example, the second RIV) may be each indicated by, for example, a given field value (for example, an FRDA field value) in DCI. The information indicating the interlace index $N_{INT}$ common to the first and second bands may be indicated by the given field value in the DCI or may be indicated by another field value.

In FIG. 6, similarly to FIG. 5, association between each RB in the first and second bands and an interlace index (interlace or RB set) is performed. In the following, differences from FIG. 5 will be mainly described.

The UE may determine, as frequency-domain resources to be assigned to a PUSCH, an RB set (interlace #0) specified by the interlace index $N_{INT1}$ (in FIG. 6, $N_{INT1}$=0) in each of the first band determined by the start resource block $RB_{START1}$ and the number $L_{RBs1}$ of resource blocks and the second band determined by the start resource block $RB_{START2}$ and the number $L_{RBs2}$ of resource blocks.

In FIG. 6, the interlace index $N_{INT}$ is specified in common to a plurality of discontiguous bands in a carrier, one or more RB sets can be assigned to a PUSCH transmitted by interlace transmission by reducing extension to an existing DCI format (for example, DCI format 0_0 or 0_1) (for example, by indicating a plurality of RIVs and the interlace index $N_{INT}$).

Figure 7:
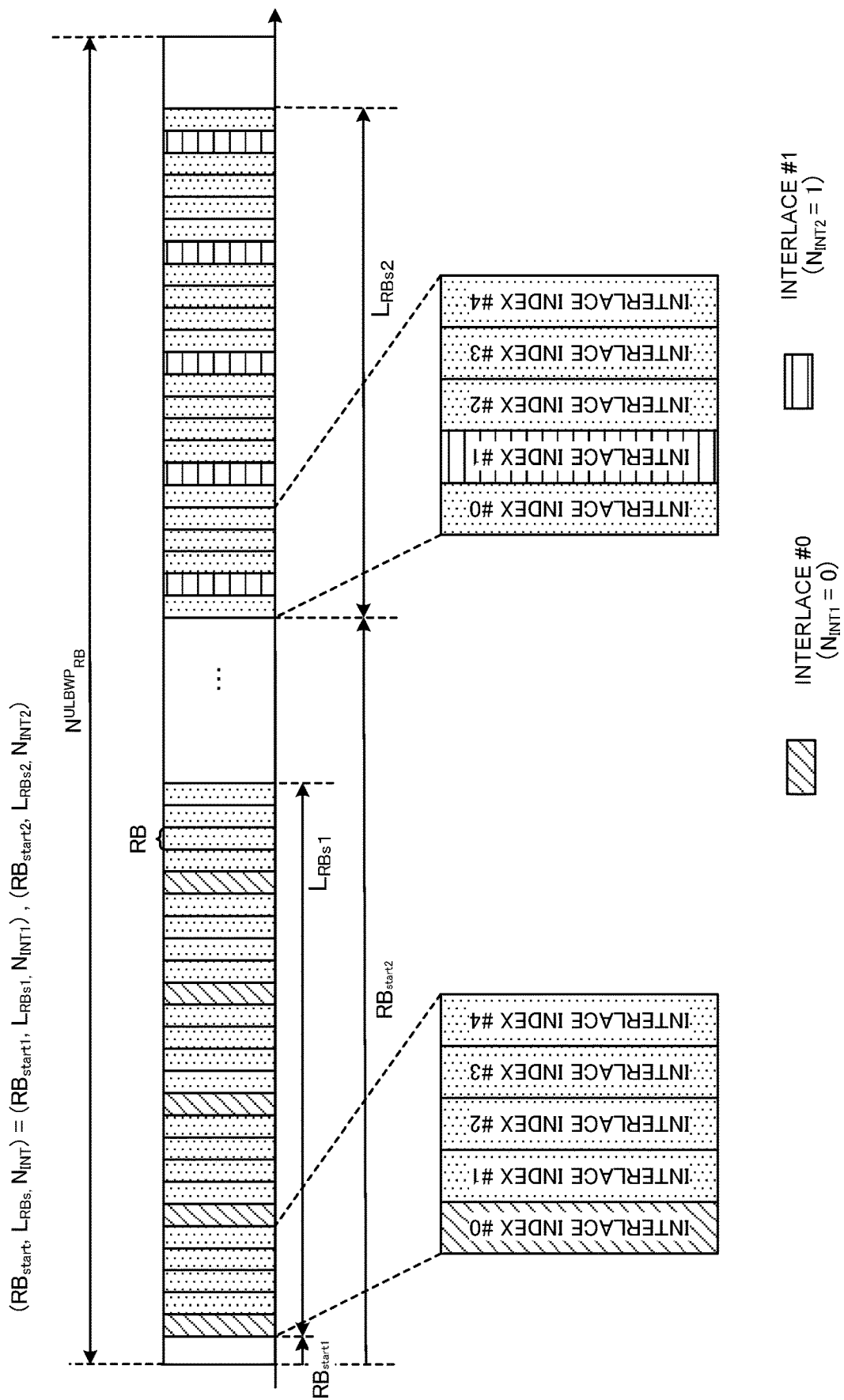
FIG. 7 is a diagram to show another example of interlace frequency-domain resource assignment in discontiguous bands according to the second aspect.

FIG. 7 is a diagram to show another example of interlace frequency-domain resource assignment in a discontiguous band according to the second aspect. FIG. 7 is different from FIG. 6 in that the UE receives information indicating individual interlace indices $N_{INT1}$ and $N_{INT2}$ for the first and second bands in place of the interlace index $N_{INT}$ common to the first and second bands in FIG. 6. In the following, differences from FIG. 6 will be mainly described.

The UE may determine, as frequency-domain resources to be assigned to a PUSCH, an RB set (interlace #0) specified by the interlace index $N_{INT1}$ (in FIG. 7, $N_{INT1}$=0) in the first band determined by the start resource block $RB_{START1}$ and the number $L_{RBs1}$ of resource blocks.

The UE may determine, as frequency-domain resources to be assigned to a PUSCH, an RB set (interlace #1) specified by the interlace index $N_{INT2}$ (in FIG. 7, $N_{INT2}$=1) in the second band determined by the start resource block $RB_{START2}$ and the number $L_{RBs2}$ of resource blocks.

In FIG. 7, since the interlace index $N_{INT}$ is specified for each of a plurality of discontiguous bands in a carrier, one or more RB sets can be flexibly assigned to, for each discontiguous band, a PUSCH transmitted by interlace transmission while reducing extension to an existing DCI format (for example, DCI format 0_0 or 0_1) (for example, by indicating a plurality of RIVs and a plurality of interlace indices $N_{INT}$).

According to the second aspect, frequency-domain resources can be appropriately assigned to a PUSCH transmitted by interlace transmission since the resource assignment information includes information (for example, an RIV) indicating the start resource block $RB_{START}$ of each band used for the PUSCH in a carrier and the number $L_{RBs}$ of resource blocks in the band.

(Third Aspect)

In a third aspect, the resource assignment information may include information indicating an index (LBT sub-band index) $N_{LSB}$ of at least one LBT sub-band (listening band) in a carrier, and information indicating an index (RB set index or interlace index) $N_{INT}$ of at least one RB set in the at least one LBT sub-band.

The UE may receive the information indicating each LBT sub-band index $N_{LSB}$ and the information indicating at least one interlace index $N_{INT}$ and may determine, as frequency-domain resources to be assigned to a PUSCH, an RB set (interlace) of at least one interlace index $N_{INT}$ in a given band determined based on the LBT sub-band index $N_{LSB}$.

The information indicating each LBT sub-band index $N_{LSB}$ may be indicated by a given field value (for example, FDRA field value) in DCI (for example, DCI format 0_0 or 0_1). The information indicating at least one interlace index $N_{INT}$ may be indicated by the given field value (for example, FDRA field value) in the DCI or may be indicated by another field value.

Association between each RB in each LBT sub-band and an interlace index may be determined in specifications in advance or may be configured for the UE by higher layer signaling.

Figure 8:
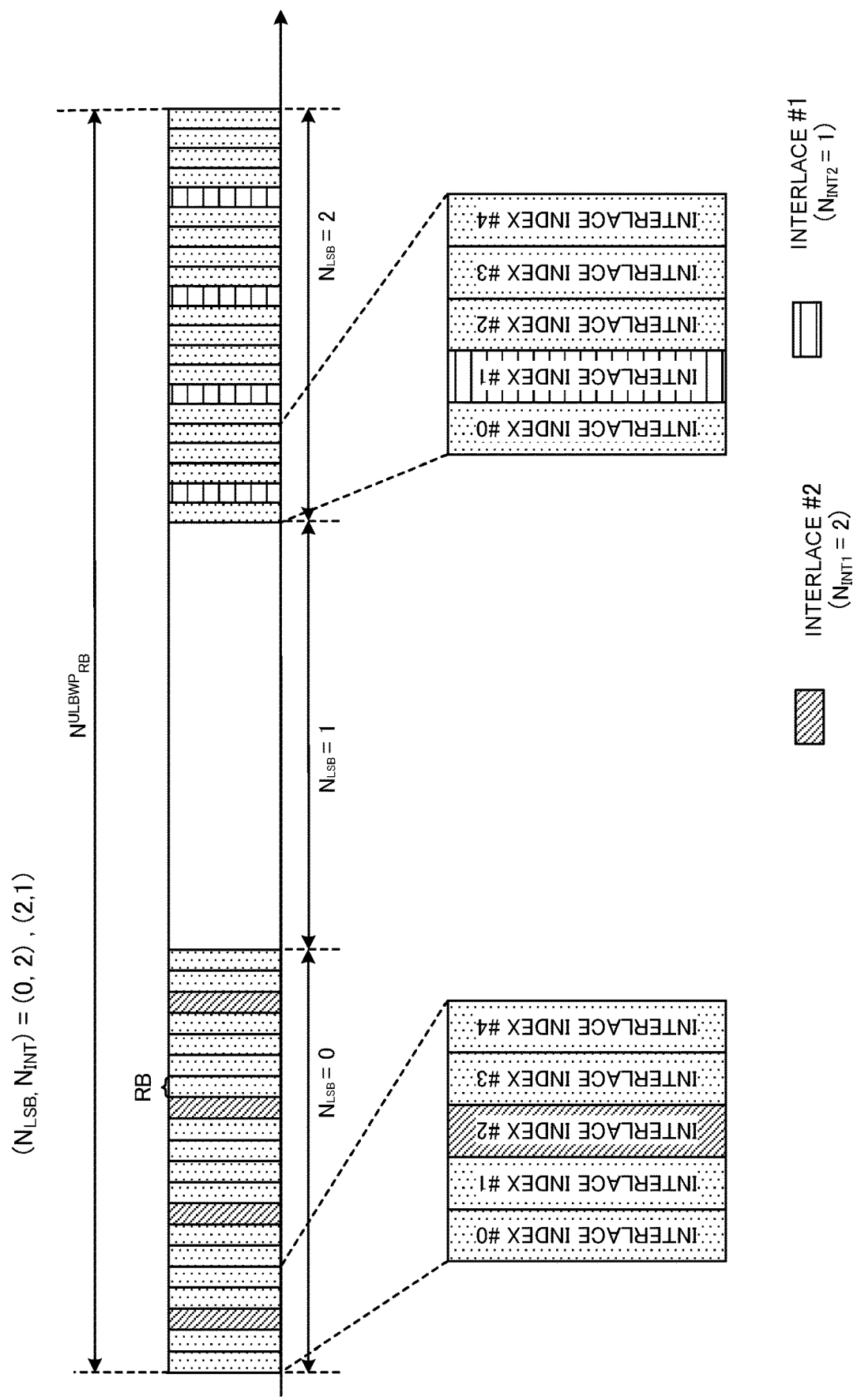
FIG. 8 is a diagram to show an example of interlace frequency-domain resource assignment according to a third aspect.

FIG. 8 is a diagram to show an example of interlace frequency-domain resource assignment according to the third aspect. In FIG. 8, three LBT sub-bands are provided in a carrier, but the present aspect is not limited thereto, and one or more LBT sub-bands may be provided in a carrier.

In FIG. 8, two LBT sub-bands #0 and #2 are specified by DCI, but the present aspect is not limited thereto. The number of LBT sub-bands specified by DCI may be equal to or larger than one. A plurality of discontiguous LBT sub-bands may be specified as shown in FIG. 8, or a plurality of contiguous LBT sub-bands may be specified although not shown.

In FIG. 8, interlaces of interlace indices #0 to #4 are each configured as a set of RBs in a given interval (6-RB interval) in each LBT sub-band, but for example, the number of interlaces and association between an interlace index and an RB are not limited to those shown.

The UE may determine, as frequency-domain resources to be assigned to a PUSCH, an RB set (interlace #2) specified by the interlace index $N_{INT1}$ (in FIG. 8, $N_{INT1}$=2) in LBT sub-band #0 determined by an LBT sub-band index $N_{LSB}$.

The UE may determine, as frequency-domain resources to be assigned to a PUSCH, an RB set (interlace #1) specified by the interlace index $N_{INT2}$ (in FIG. 8, $N_{INT2}$=1) in LBT sub-band #2 determined by a LBT sub-band index $N_{LSB}$.

According to the third aspect, one or more RB sets can be flexibly assigned, with a small amount of information, to a PUSCH transmitted by interlace transmission since LBT sub-band indices and interlace indices $N_{INT}$ are specified.

(Fourth Aspect)

A fourth aspect may include information indicating an index (also referred to as partial band index, sub-band index, or the like) $N_{SB}$ of at least one partial band (sub-band) in an LBT sub-band, and information indicating an index (RB set index or interlace index) $N_{INT}$ of at least one RB set in each sub-band.

The UE may receive the information indicating at least one sub-band index $N_{SB}$ and the information indicating at least one interlace index $N_{INT}$ and may determine, as frequency-domain resources to be assigned to a PUSCH, an RB set (interlace) of the at least one interlace index $N_{INT}$ in a given band determined based on the sub-band index $N_{SB}$.

The information indicating each sub-band index $N_{SB}$ may be indicated by a given field value (for example, FDRA field value) in DCI (for example, DCI format 0_0 or 0_1). The information indicating at least one interlace index $N_{INT}$ may be indicated by the given field value (for example, FDRA field value) in the DCI or may be indicated by another field value.

Association between each RB in each sub-band and an interlace index may be determined in specifications in advance or may be configured for the UE by higher layer signaling.

Figure 9:
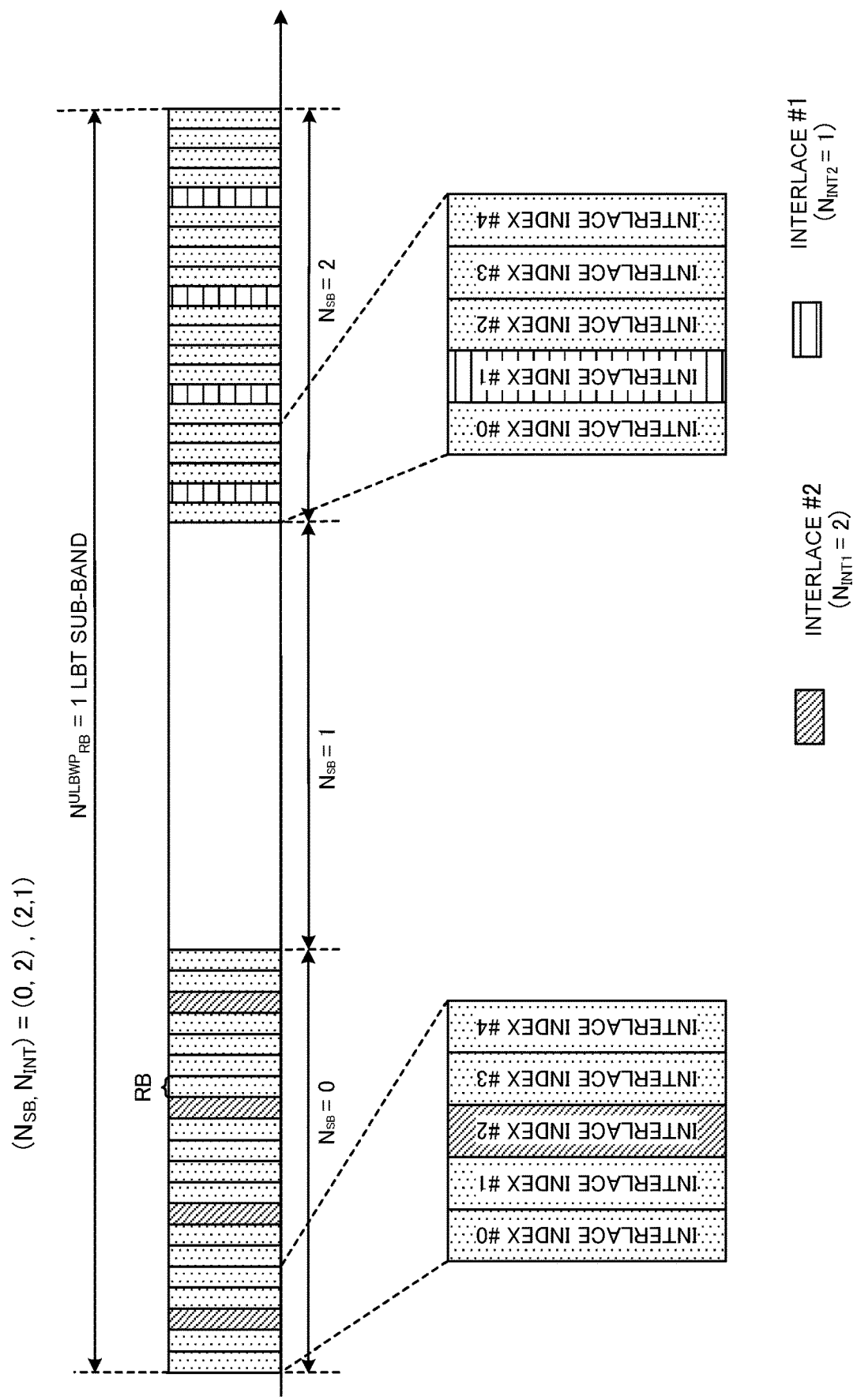
FIG. 9 is a diagram to show an example of interlace frequency-domain resource assignment according to a fourth aspect.

FIG. 9 is a diagram to show an example of interlace frequency-domain resource assignment according to the fourth aspect. In FIG. 9, one LBT sub-band is provided in a carrier and three sub-bands are provided in the one LBT sub-band, but the present aspect is not limited thereto, and one or more sub-bands may be provided in the LBT sub-band. FIG. 9 shows an example of a case in which the bandwidth ($N^{UL\_BWP}_{RB}$) of the carrier (or BWP in the carrier) is configured as one LBT sub-band, but the present aspect is not limited thereto, and the bandwidth ($N^{UL\_BWP}_{RB}$) may include one or more LBT sub-bands (n LBT sub-bands (n is a positive integer)).

In FIG. 9, two sub-bands #0 and #2 in the LBT sub-band are specified by DCI, but the present aspect is not limited thereto. The number of sub-bands specified by DCI may be equal to or larger than one. Moreover, a plurality of discontiguous sub-bands may be specified as shown in FIG. 9 or a plurality of contiguous sub-bands may be specified although not shown.

In FIG. 9, interlaces of interlace indices #0 to #4 are each configured as a set of RBs in a given interval (6-RB interval) in each sub-band, but for example, the number of interlaces and association between an interlace index and an RB are not limited to those shown.

The UE may determine, as frequency-domain resources to be assigned to a PUSCH, an RB set (interlace #2) specified by the interlace index $N_{INT1}$ (in FIG. 9, $N_{INT1}=2$), in LBT sub-band #0 determined by a sub-band index $N_{SB}$.

The UE may determine, as frequency-domain resources to be assigned to a PUSCH, an RB set (interlace #1) specified by the interlace index $N_{INT2}$ (in FIG. 9, $N_{INT2}=1$) in LBT sub-band #2 determined by a sub-band index $N_{SB}$.

According to the fourth aspect, one or more RB sets can be flexibly assigned, with a small amount of information, to a PUSCH transmitted by interlace transmission since sub-band indices in LBT sub-bands and interlace indices $N_{INT}$ are specified.

(Other Aspects)

The above-described first to fourth aspects are also applicable to, for example, PUSCH transmission using a configured grant. In a case of a configured grant of type 1, the resource assignment information may be included in a higher layer parameter (for example, configuredGrantConfig). In a case of a configured grant of type 2, the resource assignment information may be included in a higher layer parameter or DCI that activates the configured grant.

The above-described first to fourth aspects may be applied to a PDSCH. In a case of application to a PDSCH, DCI format 0_0 or 0_1 may be interpreted as DCI format 1_0 or 1_1. In addition, PUSCH transmission may be interpreted as PDSCH reception. The first to fourth aspects may be also applied to a PDSCH to which semi-persistent scheduling is applied. In this case, the resource assignment information may be included in a higher layer parameter or DCI that activates a configured grant.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
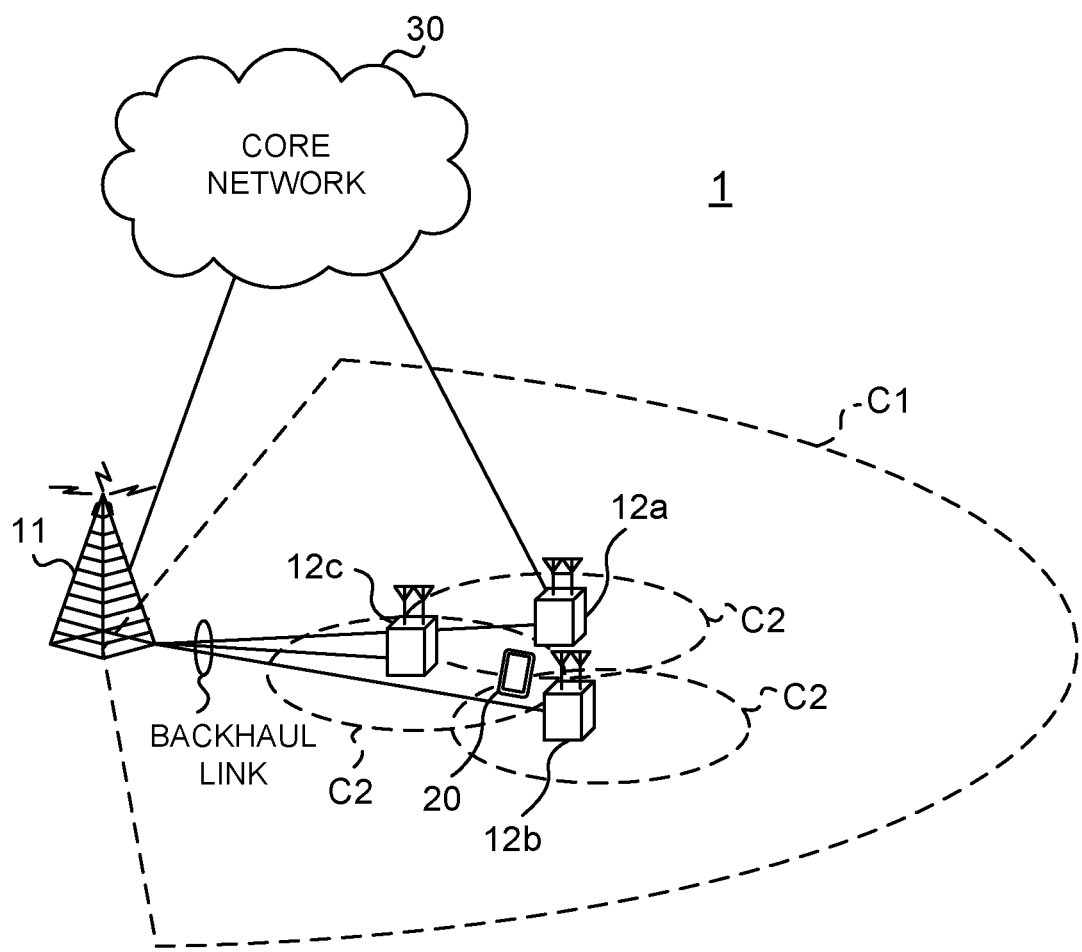
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
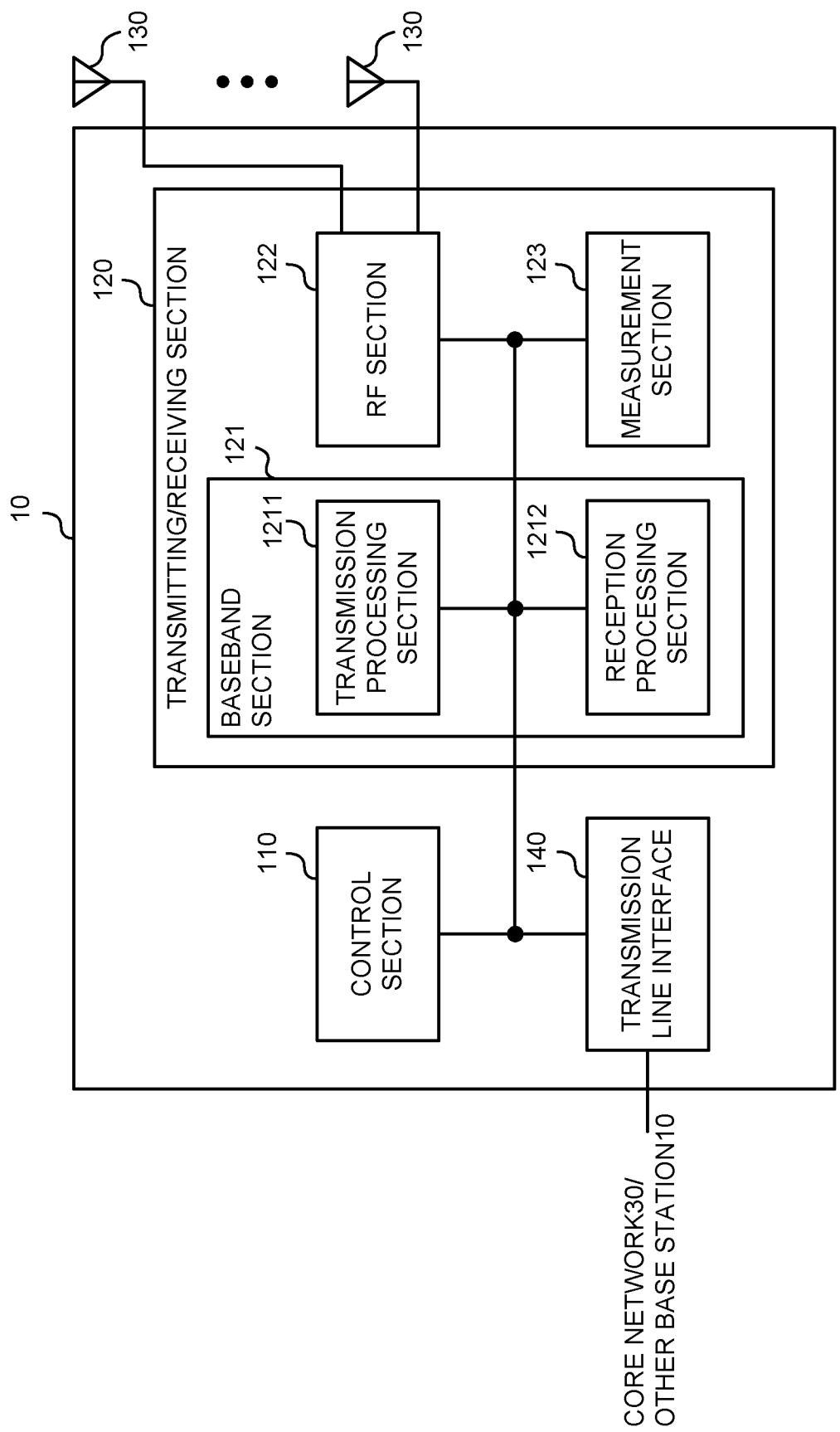
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit information (resource assignment information) used to determine a set of resource blocks in a given interval in a given band in a carrier. The transmitting/receiving section 120 may transmit a downlink shared channel or receive an uplink shared channel by using the set.

The control section 110 may determine, as frequency-domain resources to be assigned to an uplink shared channel or a downlink shared channel, the set determined based on the information.

The resource assignment information may include information indicating a start resource block of the set and the number of resource blocks contiguous from the start resource block. The control section 110 may determine, as the frequency-domain resources, the set determined based on the start resource block and the number of resource blocks (first aspect).

The resource assignment information may include information indicating a start resource block of the given band and the number of resource blocks in the given band, and information indicating the index of the set. The control section 110 may determine, as the frequency-domain resources, the set in the given band determined based on the start resource block and the number of resource blocks (second aspect).

The resource assignment information may include information indicating the index of a listening band in the carrier, and information indicating the index of the set. The control section 110 may determine, as the frequency-domain resources, the set in the given band, which is determined based on the index of the listening band (third aspect).

The resource assignment information may include information indicating the index of a partial band in a listening band in the carrier, and information indicating the index of the set. The control section 110 may determine, as the frequency-domain resources, the set in the given band determined based on the index of the partial band (fourth aspect).

(User Terminal)

Figure 12:
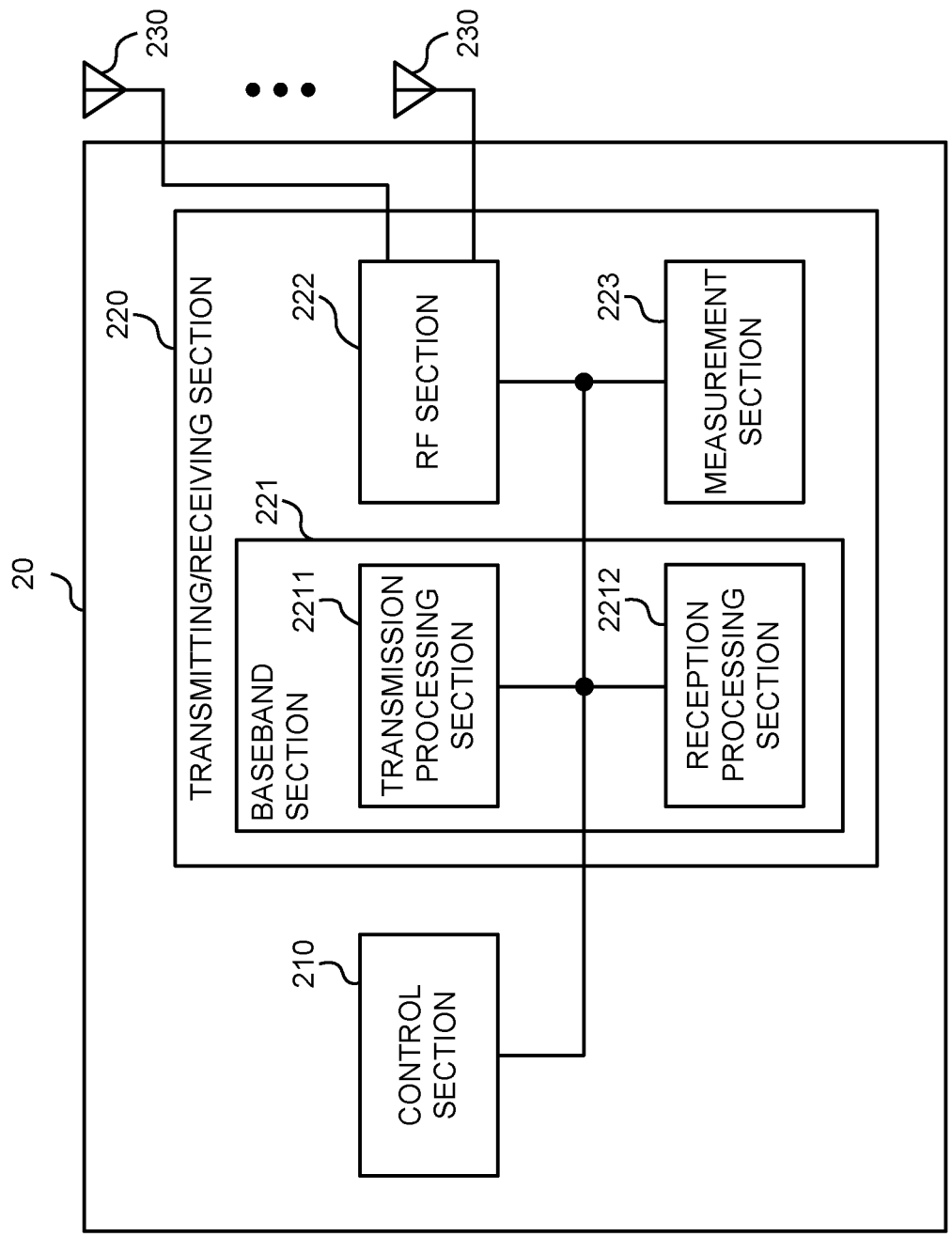
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the transmitting/receiving section 220 may receive information (the resource assignment information) used to determine a set of resource blocks in a given interval in a given band in a carrier. The transmitting/receiving section 220 may receive a downlink shared channel or transmit an uplink shared channel by using the set.

The control section 210 may determine, as frequency-domain resources to be assigned to an uplink shared channel or a downlink shared channel, the set determined based on the information.

The resource assignment information may include information indicating a start resource block of the set and the number of resource blocks contiguous from the start resource block. The control section 210 may determine, as the frequency-domain resources, the set determined based on the start resource block and the number of resource blocks (first aspect).

The resource assignment information may include information indicating a start resource block of the given band and the number of resource blocks in the given band, and information indicating the index of the set. The control section 210 may determine, as the frequency-domain resources, the set in the given band determined based on the start resource block and the number of resource blocks (second aspect).

The resource assignment information may include information indicating the index of a listening band in the carrier, and information indicating the index of the set. The control section 210 may determine, as the frequency-domain resources, the set in the given band determined based on the index of the listening band (third aspect).

The resource assignment information may include information indicating the index of a partial band in a listening band in the carrier, and information indicating the index of the set. The control section 210 may determine, as the frequency-domain resources, the set in the given band determined based on the index of the partial band (fourth aspect).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
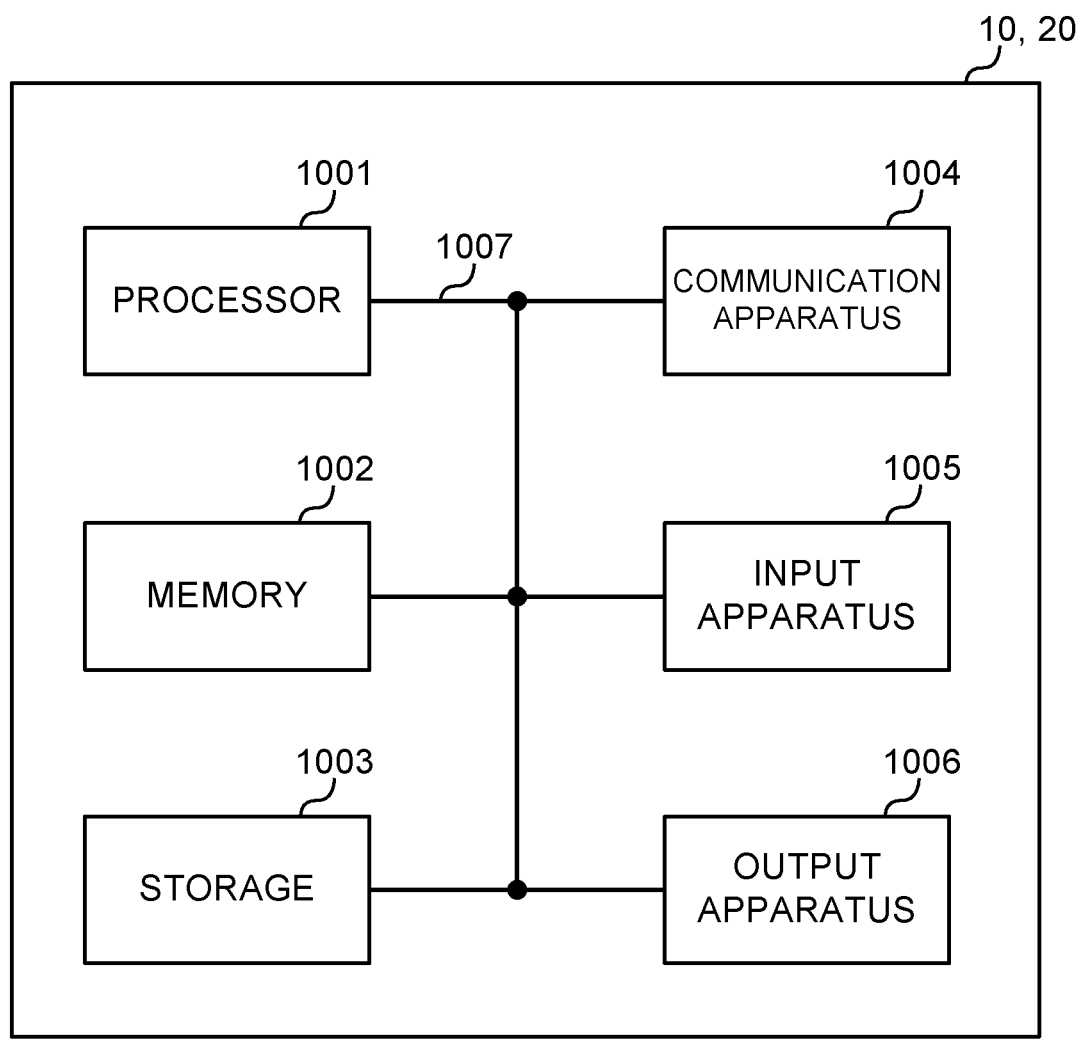
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives frequency domain resource assignment information including information indicating a start resource block and resource blocks contiguous from the start resource block in a band to which Listen Before Talk (LBT) is applied and information indicating interlace indices; and
a processor that determines the interlace in the resource blocks contiguous from the start resource block as a frequency domain resource to be allocated to an uplink shared channel,
wherein the frequency domain resource assignment information including the information indicating the start resource block and the resource blocks contiguous from the start resource block and including the information indicating the interlace indices is indicated by a frequency domain resource assignment field in downlink control information (DCI) format 0_1, and
wherein the processor determines association between each resource block among the resource blocks contiguous from the start resource block and a respective interlace index among the interlace indices based on higher layer signaling.

2. A radio communication method for a terminal, comprising:
receiving frequency domain resource assignment information including information indicating a start resource block and resource blocks contiguous from the start resource block in a band to which Listen Before Talk (LBT) is applied and information indicating interlace indices;
determining association between each resource block among the resource blocks contiguous from the start resource block and a respective interlace index among the interlace indices based on higher layer signaling; and
determining the interlace in the resource blocks contiguous from the start resource block as a frequency domain resource to be allocated to an uplink shared channel,
wherein the frequency domain resource assignment information including the information indicating the start resource block and the resource blocks contiguous from the start resource block and including the information indicating the interlace indices is indicated by a frequency domain resource assignment field in downlink control information (DCI) format 0_1.

3. A base station comprising:
a transmitter that transmits frequency domain resource assignment information including information indicating a start resource block and resource blocks contiguous from the start resource block in a band to which Listen Before Talk (LBT) is applied and information indicating interlace indices; and
a processor that controls to determine the interlace in the resource blocks contiguous from the start resource block as a frequency domain resource to be allocated to an uplink shared channel,
wherein the frequency domain resource assignment information including the information indicating the start resource block and the resource blocks contiguous from the start resource block and including the information indicating the interlace indices is indicated by a frequency domain resource assignment field in downlink control information (DCI) format 0_1, and
wherein the processor configures, to a terminal, association between each resource block among the resource blocks contiguous from the start resource block and a respective interlace index among the interlace indices, using higher layer signaling.

4. A system comprising a terminal and a base station, wherein:
the terminal comprises:
a receiver that receives frequency domain resource assignment information including information indicating a start resource block and resource blocks contiguous from the start resource block in a band to which Listen Before Talk (LBT) is applied and information indicating interlace indices; and
a processor of the terminal that determines the interlace in the resource blocks contiguous from the start resource block as a frequency domain resource to be allocated to an uplink shared channel, and
the base station comprises:
a transmitter that transmits the frequency domain resource assignment information; and
a processor of the base station that controls to determine the interlace in the resource blocks contiguous from the start resource block as the frequency domain resource,
wherein the frequency domain resource assignment information including the information indicating the start resource block and the resource blocks contiguous from the start resource block and including the information indicating the interlace indices is indicated by a frequency domain resource assignment field in downlink control information (DCI) format 0_1, and wherein the processor of the terminal determines association between each resource block among the resource blocks contiguous from the start resource block and a respective interlace index among the interlace indices based on higher layer signaling.

\* \* \* \* \*